United States Patent [19]

Havewala et al.

[11] 3,767,535
[45] Oct. 23, 1973

[54] METHOD OF REACTING AN INSOLUBILIZED ENZYME IN A FLUID MEDIUM

[75] Inventors: Noshir B. Havewala, Corning; Howard H. Weetall, Elmira, both of N.Y.

[73] Assignee: Corning Glass Works, Corning, N.Y.

[22] Filed: June 14, 1971

[21] Appl. No.: 152,507

[52] U.S. Cl. ............... 195/116, 23/288 R, 195/143, 252/477, 259/108, 195/63
[51] Int. Cl. ............................. C12b 1/00
[58] Field of Search ............ 259/8, 23, 43, 44, 259/108; 195/116, 143, 142, 1, 130, 131; 252/477; 23/288 E, 288 R

[56] References Cited
UNITED STATES PATENTS

| 1,113,151 | 10/1914 | Chisholm | 23/288 E |
| 1,678,778 | 7/1928 | Harter | 23/288 E |
| 3,649,457 | 3/1972 | Westmann | 195/68 |
| 3,669,841 | 6/1972 | Miller | 195/68 |

Primary Examiner—Alvin E. Tanenholtz
Assistant Examiner—William A. Simons
Attorney—Clarence R. Patty, Jr. et al.

[57] ABSTRACT

Facilitating action of a particulate catalyst such as an insolubilized enzyme in a fluid medium by conducting the catalytic action while the particulate catalyst is in foraminous containers attached to a rotatable and/or reciprocatable stirrer shaft.

2 Claims, 4 Drawing Figures 3,767,535

INVENTORS.
Noshir B. Havewala
Howard H. Weetall
BY
James A. Giblin
ATTORNEY

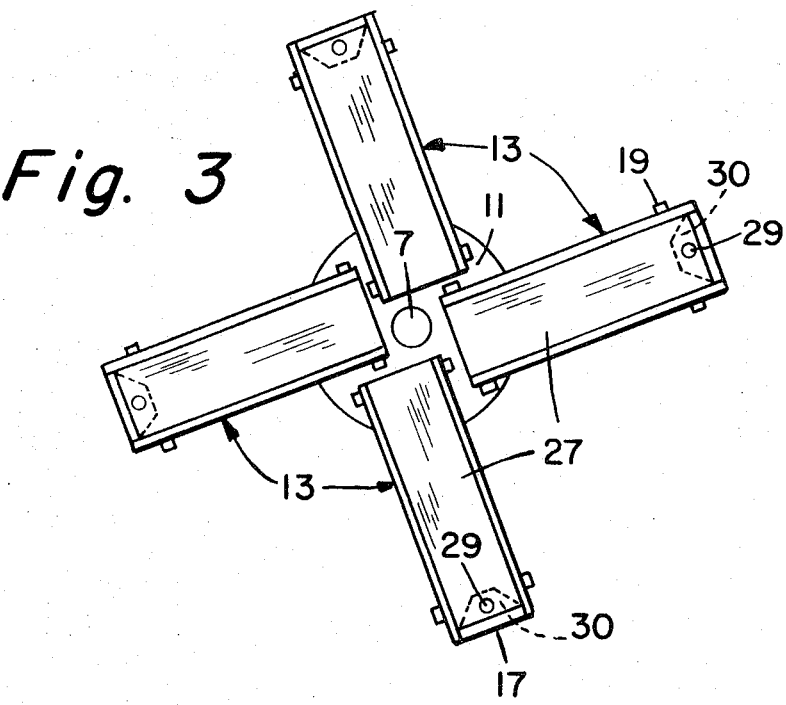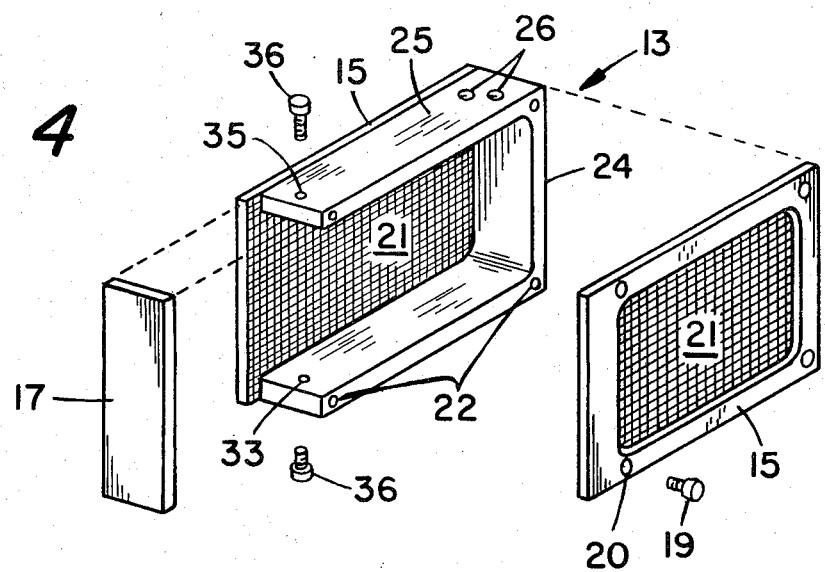

METHOD OF REACTING AN INSOLUBILIZED ENZYME IN A FLUID MEDIUM

BACKGROUND OF THE INVENTION

FIELD OF THE INVENTION

This invention relates generally to a stirring apparatus and more specifically to a stirring apparatus for use with a particulate catalyst.

A catalyst is a substance that accelerates a chemical reaction and enables it to proceed under milder conditions than otherwise possible. Typically, catalysts are not affected by the reactions they promote. Catalysts may be either soluble or insoluble in a fluid reaction which is catalyzed. In using insoluble catalysts, it is usually desirable to provide a catalyst with a larger surface area per unit weight. For this reason, many insoluble catalysts are used in a particulate and/or porous form.

Also, many otherwise soluble catalysts can be made insoluble by attachment to a water insoluble substance called a carrier. For example, in U.S. Pat. No. 3,519,538 there is taught a method for making normally soluble enzymes insoluble by chemically coupling them to a water-insoluble carrier in such a way that the enzymes do not lose their catalytic power. There are many advantages associated with insolubilizing otherwise soluble catalysts such as enzymes. For example, insolubilized catalysts can be easily removed from a reaction by readily available means such as filtration or centrifugation. Thus, a catalytic reaction may be conveniently allowed to proceed for a measurable time. Further, since the insolubilized catalysts can be easily removed, and used repeatedly, the costs associated with use of more expensive catalysts are greatly reduced.

As in the case of normally insoluble catalysts, it is usually desirable to use artificially insoluble catalysts in such a way that they offer a large surface area per unit weight of catalyst. For this reason, the water-insoluble carriers chosen for insolubilizing otherwise soluble catalysts are usually in a particulate and/or porous form. The insoluble carriers may be organic such as cellulose or any of various polymers available, or inorganic such as small glass beads or particles of porous glass.

In many respects, porous glass particles provide an ideal carrier for such catalysts as enzymes. For example, porous glass is dimensionally stable and it is relatively inert. Also, it can be easily cleaned or sterilized prior to catalyst attachment. Further, being porous, it offers an extremely large surface area per unit weight (e.g., carriers of powdered porous 96 percent silica glass of 350A.±50A. pores of less than 350 mesh are commonly used for insolubilizing enzymes). Thus, a greater amount of catalyst can be attached to the carrier by utilizing the inner surface area of the pores. By utilizing a porous carrier in comminuted or particulate form, an even greater carrier surface area is provided. Porous catalyst carriers or supports are being used more and more extensively because of the large surface area per unit weight they provide.

However, for almost all solid catalyzed fluid phase reactions, pore diffusion resistance can play an important role in determining the rate of reaction. Therefore, it has been found highly advantageous to utilize porous catalyst supports in very small size particles, thereby reducing the pore length through which reactants must pass to effectively utilize available surface area to which the catalyst is attached.

Such particulate, porous catalyst carriers can be used in a variety of chemical reactors. For example, porous catalyst supports may be used in a batch reactor, a continuous stirred tank reactor (CSTR), a fixed bed reactor, and a fluidized bed reactor.

In using the above reactors, however, it has been found the much desired small catalyst support particle size has several disadvantages in its practical applications. Industrial scale utilization of a particulate catalyst support in a fixed bed reactor is, in many cases, impractical due to extremely high resistance to the fluid flow offered by that type of packing. On the other hand, utilizing a particulate catalyst support in a batch or CSTR reaction, frequently results in attrition of the catalyst particles. The same problems are commonly encountered with fluidized bed reactors. There are yet other problems associated with using particulate catalyst supports in the above reactors. For example, in using catalyst supports or carriers of high surface area there is commonly encountered a film diffusion resistance on the particle surface which hinders catalytic action. Also, in many catalytic reactions, solid products are formed which settle on the catalyst thereby gradually diminishing available catalytic area. In addition, this makes it difficult to replace or regenerate the catalyst composite, and, in some cases, to recover the product sought. Lastly, in many catalytic reactions, it is desirable to keep solids separate from the liquid phase, thereby limiting catalytic action to the liquid phase alone. For example, if reactants containing solid materials are utilized in a fixed bed reactor containing a catalyst support, the solid materials tend to clog the reactors. Thus, in view of the numerous disadvantages associated with the use of particulate and/or porous catalyst supports, there has been a long felt need for either a method or apparatus to facilitate the use of such catalyst supports. The present invention serves that need.

SUMMARY OF THE INVENTION

We have surprisingly found that the disadvantages associated with using particulate and/or porous catalyst supports can be overcome with a stirring device that can be used in batch and continuous stirred tank reactors. The device consists of a stirrer shaft that can be driven by conventional means such as by a rotating and/or reciprocating motor or by hand, and one or more foraminous-containers for the particulate catalyst which are attached to the shaft. The foraminous containers also act as impellers when the shaft is rotatably and/or reciprocably driven in a fluid medium. In preferred embodiments, the containers comprise screen packets for holding the particulate catalyst while permitting inward and outward diffusion of reactants and products. The containers may be detachably mounted on the stirrer shaft and/or have closeable openings to facilitate the replacement or regeneration of the particulate catalyst. By controlling the speed of the shaft in a fluid medium, film diffusion resistance can be easily controlled or at least minimized.

BRIEF DESCRIPTION OF THE DRAWINGS

FIG. 3 is a bottom view of the stirrer shown in FIG. 1.

FIG. 4 is a side elevation (partially exploded) of one of the containers shown in FIG. 1 which is detached from the stirrer shaft.

SPECIFIC EMBODIMENTS

Figure 1:
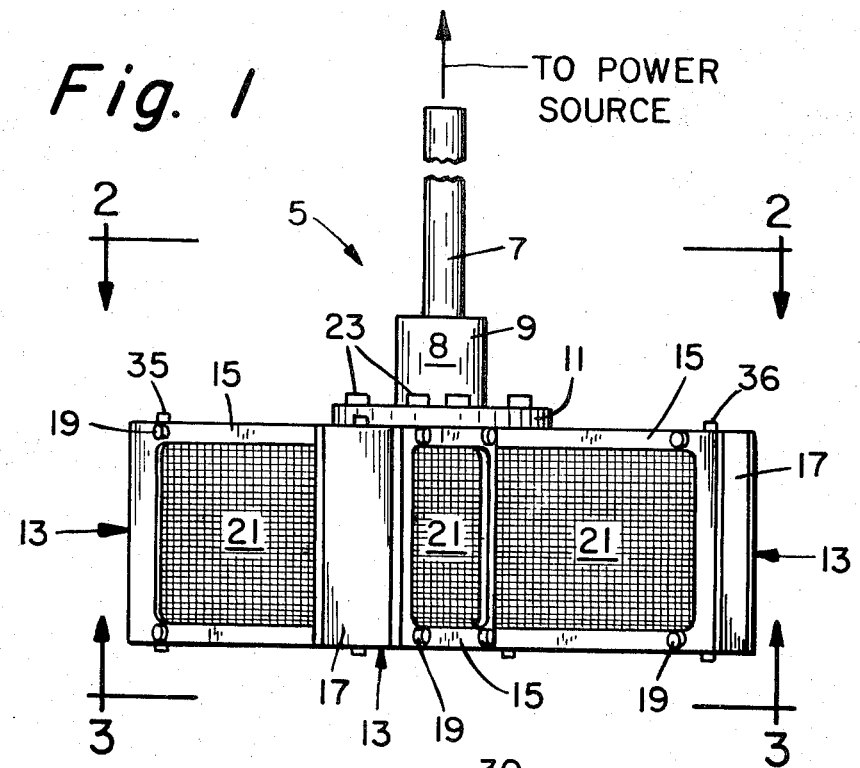
FIG. 1 shows a side elevation view of a stirrer embodying the principles of the present invention wherein three of four screen packets for the particulate catalyst are shown radially attached to the stirrer shaft which is driven by a power source not shown.

The stirrer of the present invention can be made from any materials which will not significantly affect the reaction in which they are used. The materials need only be sturdy enough to be driven or agitated in a fluid medium without significant loss of structural integrity for the rotation and/or reciprocating speed chosen for use in a medium of given viscosity. For example, if high speed rotation or reciprocation was anticipated in a relatively viscous reaction medium, it would be best to use materials of known structural stability under adverse conditions, e.g., stainless steel can be used to form the shaft as well as the packets attached to the shaft by means of stainless steel bolts. On the other hand, if a relatively slow agitating speed is used in a medium of low viscosity, the materials used to construct the stirrer could be of any lesser strength material which would not interfere with the reaction, e.g., plastics, glass, wood, and the like. Of course, the materials comprising the shaft and parts of the packets need not be the same.

As to the packets, the only requirements are that they be attachable to the shaft in such a way that they function not only as containers for the particulate catalyst, but also as impellers for the stirring device. As used herein, to function as an impeller means that the packets, when attached to the shaft which is rotated, reciprocated, or otherwise moved about in a fluid medium, tend to disrupt the apparent stillness of the fluid. The shaft can have one or more packets thus attached. In a preferred embodiment, more than one packet is attached to the shaft to balance the rotation or other movement of the stirrer shaft in use. Also, it is desirable to use more than one packet to carry greater amounts of the particulate catalyst and thus hasten the reaction, or, in some cases, to carry more than one catalyst.

The stirring assembly may be of any size commensurate with the magnitude of the reaction desired. Thus, the stirrer may be only a few inches in greatest diameter for use in a small beaker, or it may be many feet across for use in a large tank.

The power source for driving the stirrer may be any conventional source since it is not intended that the power source be a part of the present invention. Thus, for example, the shaft can be driven by rotation, reciprocation, eccentric rotation, or a combination of those means by a large or small motor or can be manually driven by a hand crank once the stirrer is held in place by support means. In a preferred embodiment, the stirrer shaft is rotated by means of a controlled RPM motor.

The foraminous container for holding the particulate catalyst should have generally evenly distributed openings, small enough to adequately contain the particulate catalyst yet large enough to permit diffusion of the reactants into the container and thereby permit intimate contact with the catalyst. The maximum size of the openings should be smaller than the average particulate catalyst size. Likewise, the products of catalysis should be able to diffuse out of the container and into the reaction medium. The openings may be in the form of perforations distributed about the container or they may result from using a screen of known mesh size to construct a container on a relatively ridged support structure. Stainless steel screen has been found to be an excellent material from which to construct the containers. Thus, when particulate catalysts such as enzymes insolubilized by bonding to porous glass particles are used, a screening of 400 to 40 mesh NBS has been found suitable since the carrier particles commonly used will generally not pass through a 40 mesh screen. It has been found that generally the particulate catalyst used in the present invention should be at least 70 mesh size to minimize or eliminate the problems referred to above.

To understand the preferred embodiment shown in the drawings, a detailed description of the figures is given below.

FIG. 1 shows a side elevational view of a stirrer employing the principles of the present invention. In FIG. 1, there can be seen that the stirrer 5 consists of a cylindrical shaft 7 about which is frictionally attached a flanged disc member 8. The flanged disc member 8 may also be secured about the shaft 7 by means of one or more set screws (not shown) which pass through the collar portion 9 to engage the shaft 7. The flanged portion 11 of the flanged disc member 8 is securely positioned on the shaft 7 distal to the power source not shown. Radially attached to the disc portion 11 of the flanged disc member 8 are box-like foraminous packets 13, three of which are shown. The relative position of a fourth foraminous packet can be seen in FIGS. 2 and 3 discussed below. As can be generally seen, each of the foraminous packets 13 shown in FIG. 1 have a box-like shape having for two sides meshed screen members 21 held in place against a frame member (not shown in FIG. 1) by retaining members 15 secured to the frame members by four screws 19 on each screened side of the container.

Figure 2:
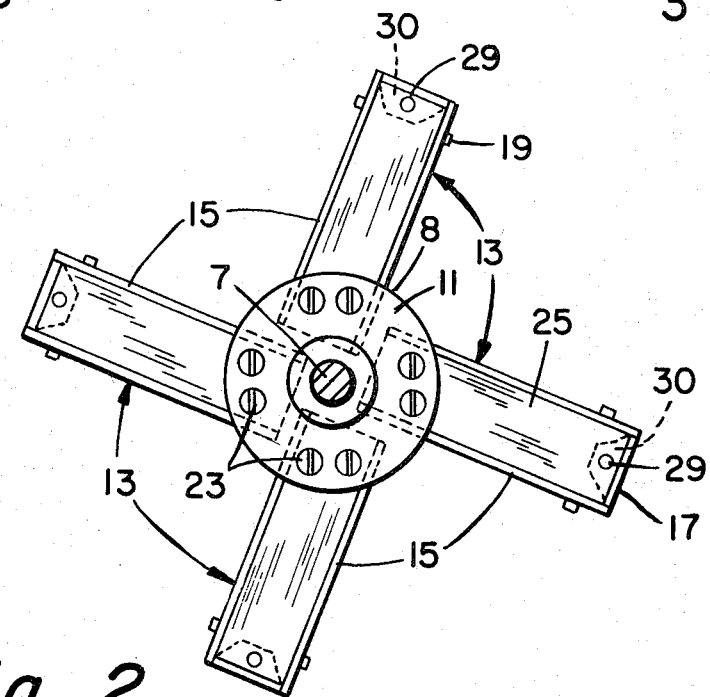
FIG. 2 is a top view of the stirrer shown in FIG. 1.

FIG. 2 is a top view of the stirring device of FIG. 1 as seen from the plane indicated by lines 2—2 of FIG. 1. In FIG. 2 the flanged disc member 3 engaged on the shaft 7 is shown in transparent form to show attachment of four foraminous packets 13 more clearly. As can be seen from FIG. 2, the four packets 13 are radially attached about the shaft 7 by means of screws 23 which pass through openings in the disc portion 11 of the flanged disc member 8. After passing through the disc portion member openings, the screws 23 engage threaded openings (not shown in FIG. 2) in the top portions 25 of each packet 13. It can be seen that the screws 23 securing the packets 13 to the disc portion 11 are positioned chordally with respect to the disc member 11 so as to secure the packets about the shaft 7 as closely as possible. Thus, the packets 13 are shown attached to the disc portion 11 in a staggered manner with the result that the attaching screws 23 in each packet engage two threaded openings (not shown) in the top portion 25 of each packet which are not in a line parallel with any one side of the box-like packets 13.

FIG. 3 shows a bottom view of the stirrer of FIG. 1 as seen from the plane of lines 3—3 of FIG. 1. There, it can also be seen that the bottom portions 27 of the packets 13 occupy staggered positions about the shaft 7 which may extend slightly through the center of the disc portion 11 of the flanged disc member.

FIG. 4 shows a partially exploded side elevational view of one of the foraminous packets 13 shown in FIGS. 1, 2, and 3 which is shown detached from the flanged disc on the stirrer shaft. As can be seen, the frame 24 of the packet 13 is a generally U-shaped member attachable to the disc portion (not shown) at the top portion 25 of the shown U-shaped member 24 by means of threaded openings 26 capable of engaging screws (not shown) which pass through similar openings in the disc portion to engage the frame member. One screen retaining member 15 is shown in exploded form to show its attachment to the frame member by means of screws 19 which pass through openings 20 to engage threaded openings 22 in the frame member 24. Also shown in exploded form is a removable end plate 17 which can be held in place against the frame member 24 to form a closed container by means of end plate screws 36 which pass through openings 35 and 33 in the upper and lower end portions of the U-shaped frame member 24. The end plate screws engage threaded openings 29 on ridge portions 30 of the end plate 17 as shown in FIGS. 2 and 3, but not shown in FIG. 4. The removable end plate 17 facilitates loading and unloading of the particulate catalyst into or out of the foraminous packet 13. The end plate 17 also serves to hold those edges of the screen 21 not held firmly against the frame 24 by the retaining members 15 against the proximal inner portions of the retaining members as shown in FIG. 4. Thus, when the end plate 17 is secured in place by the end plate retaining screws 36 the screened packet is a closed foraminous container capable of retaining the particulate catalyst while allowing diffusion of the reactants and products through the screen portions 21 of the packets.

When the packets are attached to the stirrer shaft by means of the flanged disc member, they act as impellers when the shaft is rotated or reciprocally driven in a fluid medium. By attaching the packets as close to the shaft as possible, as shown by the staggered arrangement of FIGS. 1, 2, and 3, the structural integrity of the stirrer is assured even under high speed rotation and/or reciprocation in a relatively viscous reaction medium. In the specific stirrer just described, all materials comprising the structure were stainless steel. The screen was made of stainless steel and had a mesh size of 200 NBS. The screws were also stainless steel.

It is, of course, not essential that the frame member 24 be U-shaped. For example, the frame may be made of several pieces which can be readily bolted or screwed together. Also, the packets used not need be box-like. They need only be attachable to the stirrer shaft (directly or indirectly) in such a manner that they act as impellers and as particulate catalyst containers. Further, the packets may consist of foraminous or screen walls on all sides or any one or more sides of the packet. Thus, for example, the packets may consist entirely of screening in any three dimensional shape which will permit catalysis and an impeller-effect when the packets are attached to the shaft which is rotated in a fluid medium.

The particular stirrer described above through the figures is shown in approximately the actual size of a stirrer which was used in a 2500 ml. flow-through beaker into which was continuously fed appropriate reactants for an enzymatic reaction. At the out-flow portion of the beaker, enzymatic products were collected. These products were the catalytic result of a particulate insolubilized enzyme on the reactants which flowed into the beaker. The out-flowing product concentration was remarkably high and it is thought this was due to the novel design of the stirrer containing the particulate catalyst. In the above work, the stirrer was driven by a Bodine 1/70 HP Motor, 58 RPM, Type NSH 12R, single reduction type. The stainless steel stirrer shaft rotated by the motor was about 7 ½ inches long and the motor was suitably mounted on a support means above the beaker in such a way that the attached stirrer extended into the beaker to a point about 1 to 2 inches above the beaker's inner bottom. The stirrer was successfully used for continuous periods of more than 4 weeks without adverse effect on the stirrer.

It will be apparent to those skilled in the art of catalysis that there are many obvious modifications that can be made to the stirrer of the present invention to suit particular reaction needs. For example, the stirrer may have only one packet attached, or several. The packets may contain one type of particulate catalyst, or several different catalysts in different packets. In certain enzymatic reactions, the simultaneous use of several catalysts is particularly desirable as is the simultaneous use of one or more enzymes and one or more other particulate compounds which must be available for catalytic reaction. Lastly, the packets need not be used only for particulate catalysts that remain essentially insoluble. For example, slowly dissolving particulate catalysts can be used beneficially in the present invention to permit a time capsule release of the catalyst into the reaction medium.

Thus, it is intended that because of the many modifications possible with the present invention, the invention should be limited only by the appended claims.

We claim:

1. A method of using an insolubilized enzyme for an enzymatic reaction in fluid medium, the insolubilized enzyme comprising an enzyme chemically coupled to a porous, particulate water-insoluble carrier material, comprising the steps of:
   a. placing the insolubilized enzyme in one or more foraminous containers attached to a rotatable stirrer shaft, the foraminous containers having generally evenly distributed openings, the maximum size of the openings being smaller than the average size of the enzyme carrier particles; and
   b. rotating the stirrer shaft in a reaction medium containing appropriate reactants for an enzymatic reaction.

2. The method of claim 1 wherein the carrier to which the enzyme is chemically coupled consists of porous glass particles.

* * * * *